M. G. HUBBARD.
Mowing Machine.
No. 16,484.
Patented Jan. 27, 1857.
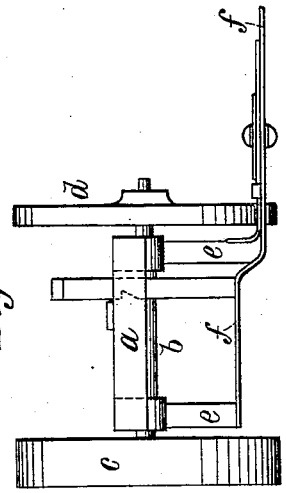
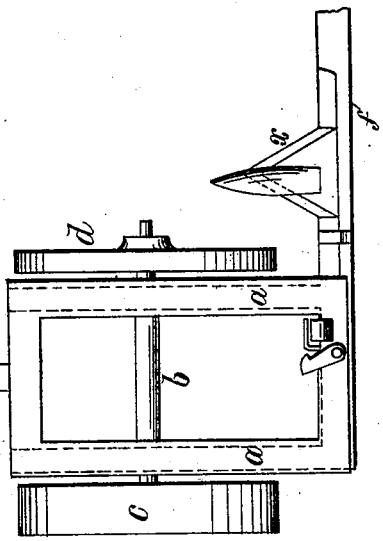
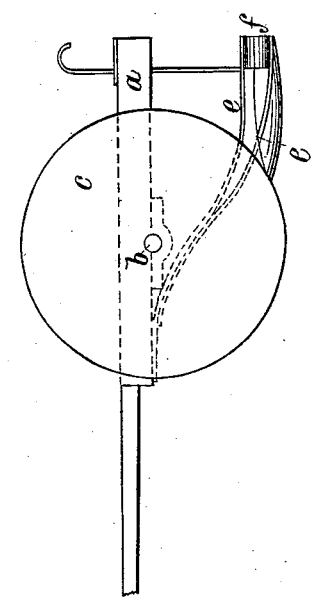
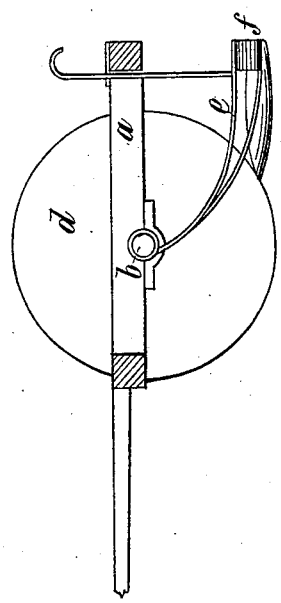
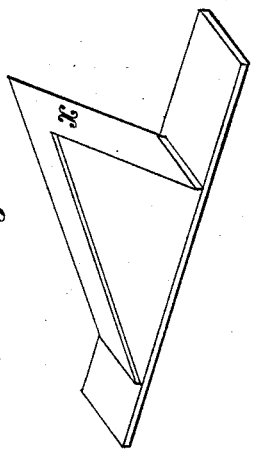

UNITED STATES PATENT OFFICE.

MOSES G. HUBBARD, OF PENN YAN, NEW YORK.

IMPROVEMENT IN HARVESTERS.

Specification forming part of Letters Patent No. 16,484, dated January 27, 1857.

*To all whom it may concern:*

Be it known that I, MOSES G. HUBBARD, of Penn Yan, in the county of Yates and State of New York, have invented certain new and useful Improvements in Harvesting-Machines; and I do hereby declare the following to fully describe and ascertain said improvements, reference being had to the accompanying drawings, in which—

Figure 1 is a side elevation; Fig. 2, a sectional elevation of a modification; Fig. 3, cutter, detached; Fig. 4, a rear elevation; Fig. 5, a plan.

My improvements in harvesters relate to the connection of the finger-bar with the frame. I place my finger-bar below the frame, in rear of the wheels, and extend the same entirely across under the frame. To the extended portion of the finger-bar I affix arms, by which it is connected with the frame, so as to rise and fall independent of the rise and fall of the frame.

By the above arrangement I am enabled to use a pole rigidly affixed to the frame, as the finger-bar is not affected by its vertical motions, and the driving-wheel is sure, under all circumstances, to maintain its contact with the ground, besides which I can at will raise the finger-bar from the ground, and when necessary sustain it free from contact therewith when being transported from the field, or to avoid obstructions during the operation of the machine in the field.

The construction is as follows:

$a$ is an oblong frame, supported by an axle, $b$, upon two wheels, $c\ d$, one of which, $c$, is affixed to and revolves with the axle. The other, $d$, turns independent upon the axle for the convenience of turning. The finger-bar $f$ is affixed to the frame $a$ by two flat elastic spring-braces, $e\ e$, rigidly attached to the frame and finger-bar, so that the finger-bar can have a vertical motion independent of the frame to which it is attached, its motion being governed by the surface of the ground when in action or raised above it, when not cutting, by the operator.

The finger-bar, it will be noticed, extends under the frame beyond the side, so as to admit the attachment of the spring arms or braces upon which it is fastened. That part of the bar that is under the frame I elevate somewhat above the level of the other parts, so as to clear the previous swath. The spring-arms are so formed as to have the inner one, or that next the standing grass, bear down, while the outer one, affixed to the outer end of the finger-bar, that projects under the frame, bears upward, so as to tend to hold down the opposite end of the finger-bar and cause the extreme end in the grass to follow the surface of the ground. This attachment of the finger-bar by two flat springs placed at some distance apart, to which it is rigidly affixed, that act in opposite directions, so as to cause the finger-bar to assume the proper position to follow all the inequalities of the ground, while it is free to be raised entirely from the work, are the important features of my invention, and necessary to its perfect results.

To clear the finger-bar from the ground, I intend to employ a lever or any other convenient and well-known fixture, operated by the driver, by which he can quickly avoid any obstacle in the field or hitch it up to the frame above to transport.

The driving apparatus that vibrates the cutters is connected with the driving-wheel $c$ by any of the well-known gearing, which I have therefore omitted to show or describe.

Having thus fully described my improved harvester, what I claim therein as new, and for which I desire to secure Letters Patent, is—

The mode herein described of attaching the finger-bar to the frame by means of two flat springs, when the same are so constructed and arranged as to operate in relation to each other substantially as and for the purposes set forth.

M. G. HUBBARD.

Witnesses:
WM. S. HASCALL,
R. F. ANDREWS.